March 8, 1960 A. L. LEE 2,927,654
DRIVE MEANS FOR A MINE HAULAGE VEHICLE
Filed April 26, 1957 3 Sheets-Sheet 1
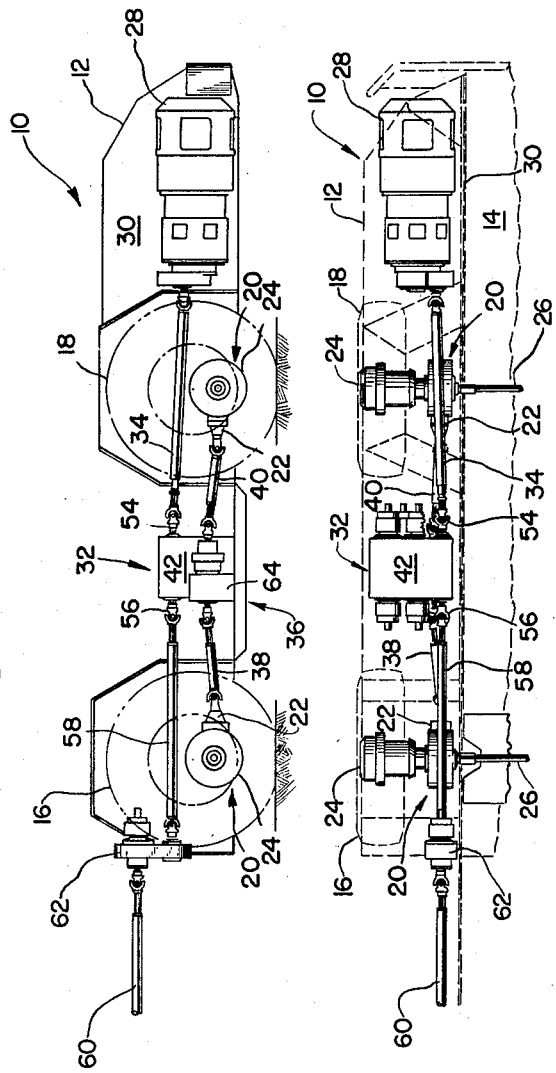
INVENTOR.
ARTHUR L. LEE
BY
HIS ATTORNEY March 8, 1960 A. L. LEE 2,927,654
DRIVE MEANS FOR A MINE HAULAGE VEHICLE
Filed April 26, 1957 3 Sheets-Sheet 2
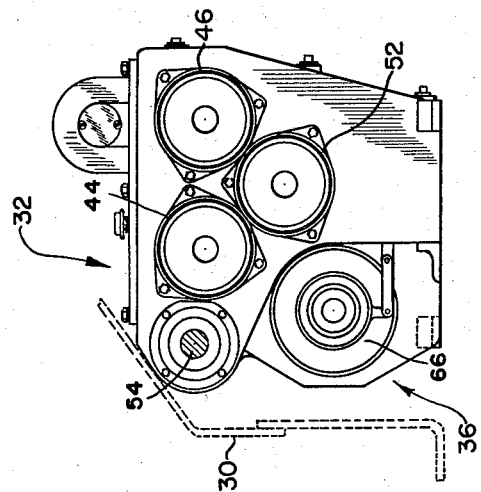
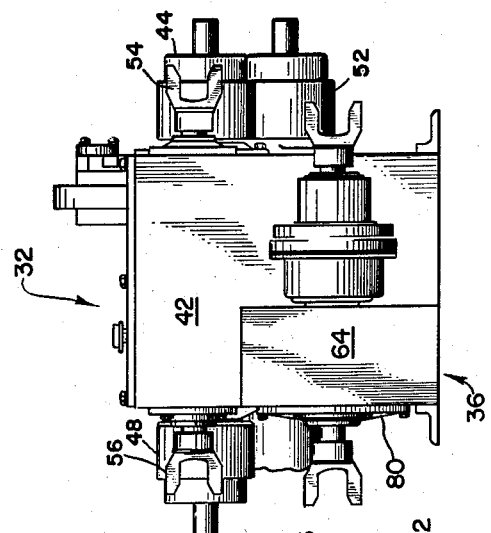
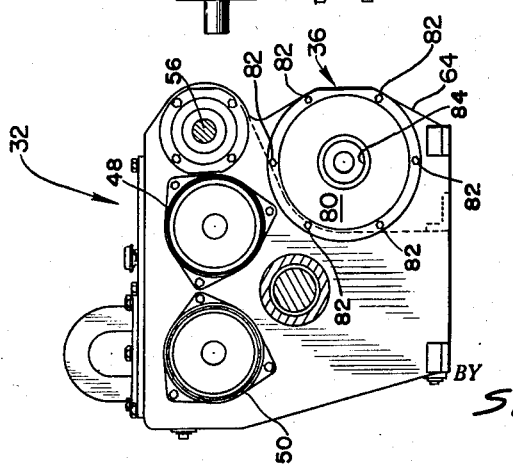
INVENTOR.
ARTHUR L. LEE
BY
HIS ATTORNEY

INVENTOR.
ARTHUR L. LEE

United States Patent Office 2,927,654
Patented Mar. 8, 1960

2,927,654

DRIVE MEANS FOR A MINE HAULAGE VEHICLE

Arthur L. Lee, Columbus, Ohio, assignor to Consolidation Coal Company, Pittsburgh, Pa., a corporation of Pennsylvania Application April 26, 1957, Serial No. 655,412

2 Claims. (Cl. 180—49)

This invention relates to a drive means for a haulage vehicle and more particularly to the drive means for a pair of differentially driven output shafts.

The present application is a continuation-in-part of my copending application Serial Number 535,919, filed September 22, 1955, now abandoned, which is a division of Patent Number 2,754,015, assigned to the assignee of the present invention.

Providing tractive power to all four wheels of a shuttle type haulage vehicle is one of the major problems encountered in its fabrication and construction. Factors which give rise to this problem are: the restricted lateral and vertical dimensions of the haulage vehicle; steering and driving connections to all four wheels; the recessed material receiving compartment that extends lengthwise of the mobile body; the endless conveyor positioned along the bottom of the material receiving compartment; and the horizontally pivoted discharge boom.

The dimensions of the haulage vehicle are, of necessity, limited to the physical dimensions of the passageway through which the vehicle must travel. The passageways are narrow and have a limited lateral dimension. This lateral dimension of the passageway thus places the upper limit on the lateral dimension of the haulage vehicle. The height of the passageway, which is usually the height of the mineral seam, places an upper limit on the height of the vehicle. In addition to the physical dimensions of the passageways the load carrying capacity of the vehicle must be considered in its construction because the greater the payload the fewer shuttle trips required to transport a given amount of dislodged material. To accommodate as large a payload as possible, the haulage vehicle has a centrally positioned recessed material receiving compartment that extends along its entire length. Since the size of this material receiving compartment is directly proportional to the payload of the haulage vehicle, the material receiving compartment is constructed as wide as possible. When all of the above dimensional and load carrying limitations are resolved to produce a vehicle of adequate size, little space remains on the vehicle for the prime movers and the driving connections to all four wheels.

It has been the practice in the past to employ a plurality of variable speed prime movers to drive all four wheels. In one arrangement, each wheel was provided with a variable speed prime mover so that, in effect, each wheel was individually driven. Other arrangements included a prime mover to drive a single pair of wheels. This resulted in a prime mover driving either a laterally spaced pair of wheels or a longitudinally spaced pair of wheels. The plurality of prime movers contributed other serious limitations to the construction and fabrication of the haulage vehicle. Besides the added weight and additional costs of the added prime movers, elaborate electrical controls were required to synchronize the prime movers for proper operation. These controls and multitude of prime movers resulted in extended periods of vehicle inoperation due to preventative maintenance, repairs, and replacement of worn parts.

The fact that the haulage vehicle travels through narrow passageways required that the vehicle be a shuttle type vehicle. That is, the vehicle must travel with equal ease and at substantially the same speed in both directions. To possess this shuttle feature, the haulage vehicle employed prime movers that would operate in both directions. Again, this necessitated the use of a specific type of prime mover and excluded inexpensive conventional uni-directional constant speed prime movers.

The haulage vehicle described in Patent 2,754,015 entitled "Mine Haulage Vehicle" granted to me, employs a single prime mover to supply traction to all four wheels. The prime mover employed may be an inexpensive conventional uni-directional constant speed type prime mover. The variation in speed of the propelling wheels is made possible by a multi-speed forward and reverse transmission that is interposed between the single prime mover and the driving connections to all four wheels. With this arrangement the additional prime movers, their controls, etc., are eliminated. In addition, a conventional type uni-directional constant speed prime mover may be employed.

As illustrated in the above named patent, the transmission, through a terminal element, drives a pair of oppositely extending output shafts. These output shafts are each in turn connected to driving connections for a pair of laterally spaced wheels. It has been discovered by me that greater efficiency in the drive arrangement is obtained if the transmission terminal element is arranged to drive a longitudinal differential mechanism and the pair of output shafts are differentially driven in respect to each other. This longitudinal differential mechanism corrects for differences in the diametrical dimension of the tires on longitudinally spaced wheels and eliminates wear of the various moving parts that would result from a direct connection between the terminal element of the transmission and the driving connection to both laterally spaced pairs of wheels.

With the above advantages, however, it was discovered that if any of the four drive wheels lost traction because of terrain conditions, substantially all of the power from the prime mover was transmitted through the longitudinal differential to the pair of wheels that included the wheel having the least traction. This resulted in the spinning of the traction-free wheel and the immobilization of the vehicle until traction was restored to the traction free wheel.

To compensate for this loss of traction there is provided a novel means to manually lock the longitudinal differential between the front pair and rear pair of wheels so that, when necessary, power from the prime mover may be equally distributed to both the front pair and rear pair of wheels. With this improved manual lock-up means if one or even a pair of laterally spaced wheels loses traction, the lock-up mechanism will provide equal torque to both pair of laterally spaced wheels so that the vehicle is not immobilized and can be driven by the pair of wheels having traction.

This application is a continuation-in-part of my application, Serial Number 535,919, filed September 22, 1955, now abandoned, entitled "Mine Haulage Vehicle." The last named application, in turn, is a division of a parent application, Serial Number 244,549, filed August 31, 1951, entitled "Mine Haulage Vehicle," now Patent 2,754,015.

Accordingly, the principal object of this invention is to provide a vehicle having a single prime mover, four traction wheels and differentially driven output shafts connecting the prime mover to the front pair of laterally spaced wheels and the rear pair of laterally spaced wheels.

Another object of this invention is to provide a differentially driven vehicle with a hydraulically operated manual lock-up means for the differential.

Another object of this invention is to provide a differential lock-up means wherein the differential housing may be frictionally engaged to one of the output shafts.

A further object of this invention is to provide a novel means for supplying liquid under pressure to the lock-up means.

This invention comprises the new and improved construction and combination of parts and their operating relation to each other which will be described more fully hereinafter and the novelty of which will be particularly pointed out and distinctly claimed.

In the accompanying drawings, to be taken as part of this specification, I have fully and clearly illustrated my invention, in which drawings:

Figure 1 is a fragmentary view in elevation of my haulage vehicle illustrating the driving connections between the prime movers and the transmission, and between the longitudinal differential mechanism and the driving connections to each pair of laterally spaced wheels.

Figure 2 is a fragmentary plan view similar to Figure 1.

Figure 3 is an enlarged view in side elevation of the transmission casing and differential lock-up means illustrated in Figure 1.

Figure 4 is a view in front elevation of the mechanism illustrated in Figure 3.

Figure 5 is a rear view in elevation of the mechanism illustrated in Figure 3.

Figure 6:
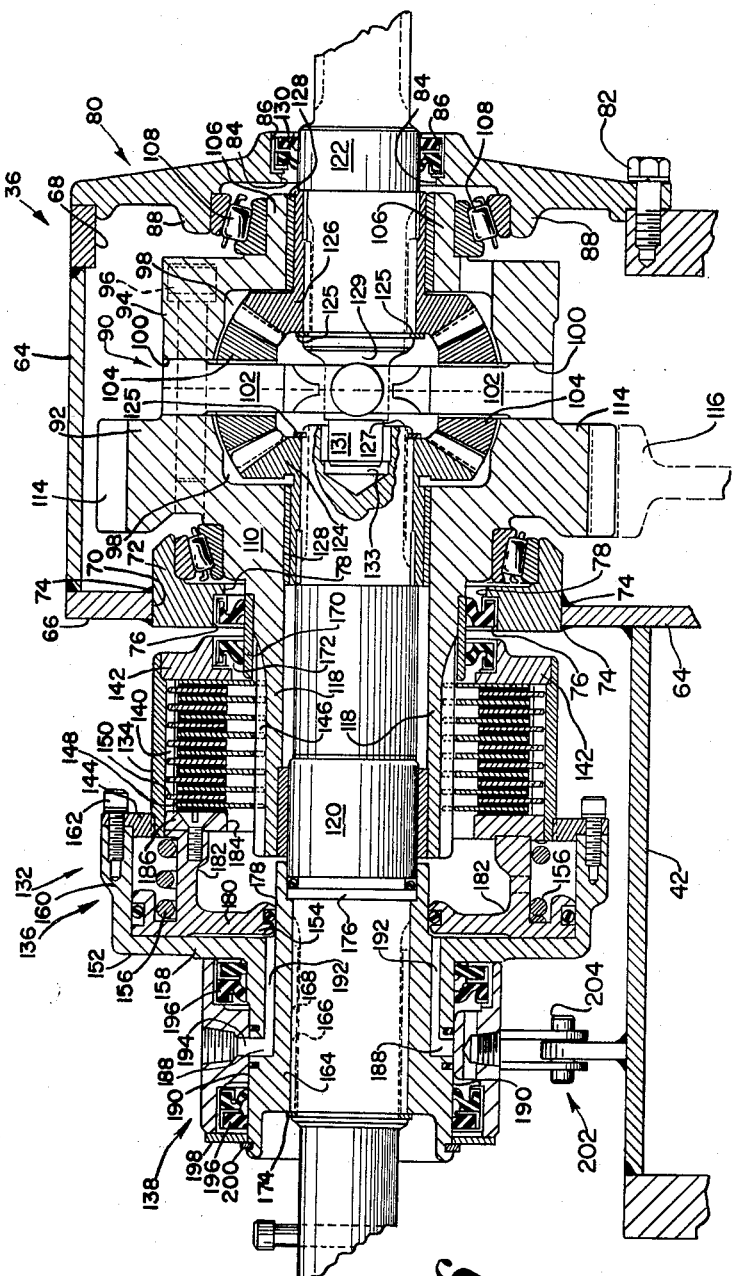
Figure 6 is a fragmentary view in section illustrating the differential mechanism and differential lock-up means.

Referring to the drawings and particularly Figures 1 and 2 there is illustrated a haulage vehicle generally designated by the numeral 10 having a mobile body 12 and a material haulage compartment 14. The specific construction of the haulage vehicle 10, mobile body 12 and material haulage compartment 14 is clearly illustrated and described in Patent No. 2,754,015. The haulage vehicle 10 has a pair of front traction wheels 16 and a pair of rear traction wheels 18 (only one of which is shown). The pairs of front and rear traction wheels 16 and 18 are drivingly connected to each other by means of driving connections generally designated by the numeral 20. The driving connections 20 include a transverse differential mechanism 22, a pair of wheel assemblies 24 and transverse shafts 26. The transverse shafts 26 connect one of the output connections of the transverse differential 22 to the wheel assembly 24 arranged on the other side of the mobile body 12. The front and rear pairs of wheels 16 and 18 in addition to being traction wheels are also steerable so that the haulage vehicle 10 is provided with four traction and steerable wheels.

The mobile body 12 has a prime mover 28 positioned thereon at one side of the material haulage compartment 18 adjacent the haulage compartment side wall 30. The unidirectional prime mover 28 is connected to a selective multispeed transmission 32 by means of a propeller shaft 34. The transmission 32 is a constant mesh multispeed selective transmission arranged to provide a plurality of speeds in both directions. This transmission is illustrated in Patent No. 2,712,245 entitled "Hydraulically Controlled Transmission" granted to me. The transmission terminal element (later described) drives a longitudinal differential mechanism generally designated by the numeral 36. The differential mechanism 36 is in turn connected to a pair of oppositely extending output shafts 38 and 40. The output shaft 38 is connected at its free end to the front transverse differential 22 and the other output shaft 40 is similarly connected to the rear transverse differential 22 to provide driving power to all four wheels. All of the shafts are connected to the various members by unnumbered universal connecting means.

With this arrangement power is transmitted from the uni-directional prime mover 28, which may be a constant speed motor, to the transmission 32 and from the transmission 32 through the longitudinal differential mechanism 36, power output shafts 38 and 40 to the driving connections 20 for the front pair of wheels 16 and to the driving connections 20 for the rear pair of wheels 18. By means of the transmission 32 the speed and direction of the haulage vehicle may be selectively regulated.

The transmission 32 illustrated in Figures 3, 4 and 5 has a casing 42 which encloses the gearing therein. A pair of external directional clutches 44 and 46 selectively drive the gearing either in a forward or reverse direction depending upon the alternative engagement of forward directional clutch 44 or reverse directional clutch 46 (Figure 4). Change speed clutches 48 and 50 (Figure 5) and 52 (Figure 4) selectively engage change speed gearing so that the terminal element of the transmission may be driven at predetermined selected speeds. For example, the engagement of clutch 48 drives the transmission terminal element at a low speed, engagement of clutch 50 drives the transmission terminal element at an intermediate speed and engagement of clutch 52 drives the transmission terminal element at a high speed. The propeller shaft 34 which connects the transmission 32 to the prime mover 28 is connected to a transmission input shaft connection 54. An auxiliary output shaft connection 56 is arranged to drive an auxiliary shaft 58 which, as illustrated in Figure 1, drives the conveyor drive shaft 60 through a clutch mechanism 62.

As illustrated in Figures 2 and 4 the transmission 32 is positioned adjacent the material haulage compartment side wall 30, and within the periphery of the mobile body 12 so that it is protected from damage by the side walls of the passageways.

The detailed construction of the longitudinal differential mechanism 36 and differential casing 64 is illustrated in Figure 6.

The transmission casing 42 has a portion 64 that encloses the longitudinal differential mechanism 36 (Figures 3, 4 and 6), which for convenience will be termed the differential casing 64. The differential casing 64 is cylindrical in shape and has a closed rear end portion 66 (Figures 4 and 6) and an open front end portion 68 (Figure 6). The closed rear end portion 66 has an aperture 70 therethrough. An annular bearing support member 72 is rigidly secured in the aperture 70 by means of welds 74. The bearing support member 72 has a centrally positioned aperture 76 with an inwardly extending shoulder portion 78 adjacent the inner wall of the bearing support 72.

A dish shaped closure member 80 encloses the differential casing open end portion 68 and is detachably secured thereto by means of a plurality of bolts 82 which are threadably secured in the transmission casing 42 and differential casing 64. The closure member 80 has an aperture 84 therethrough with a ring receiving recessed portion 86. The inner wall of the closure member 80 has an annular inwardly extending bearing portion 88.

The differential mechanism 36 has a differential housing generally designated by the numeral 90 positioned within the differential casing 64. The differential housing 90 is constructed in two parts designated 92 and 94 which are secured to each other by a plurality of bolts 96. The differential housing 90 has an inner cavity portion 98 and a plurality of radially extending apertures 100 which are adapted to receive a differential cross 102. The differential cross 102 has a plurality of bevel gears 104 mounted thereon and has its free end portions extending into the differential housing apertures 100 so that both the bevel gears 104 and differential cross 102 rotate with the differential housing 90.

The differential housing portion 94 has an annular end portion 106 which is aligned with the closure aperture 84. The external surface of the housing 106 is rotatably supported by means of an annular bearing 108 in the closure member 80. The differential housing portion 92 has an annular portion 110 which is rotatably supported by means of an annular ring 128 so that the differential housing 90 is freely rotatable along an axis parallel to the longitudinal axis of the transmission 32. The differential housing 90 has an externally toothed spur gear portion 114 which is in meshing relation with the transmission output spur gear 116. The output spur gear 116 may be termed for convenience the terminal element of the transmission 32. Thus, the output of the transmission at a predetermined selected direction and selected speed is transmitted through the terminal element spur gear 116 to the spur gear 114 which is an integral part of the differential housing 90. With this arrangement the differential housing 90 rotates at a predetermined speed in a predetermined direction depending upon the transmission 32.

The differential housing 90 has a sleeve portion 118 extending through the aperture 76 in the bearing support member 72. A pair of shafts 120 and 122 extend in opposite directions through the respective differential housing sleeve portion 118 and the annular end portion 106. The shafts 120 and 122 respectively have beveled gears 124 and 126 splined adjacent their end portions which are positioned within the differential housing cavity 98. The bevel gears 124 and 126 are in meshing relation with the bevel gears 104 so that the rotation of spur gear 114 is transmitted through bevel gears 104 to the bevel gears 124 which in turn transmit the rotation to the respective shafts 120 and 122. The respective shaft end portions 127 and 129 are retained within the differential housing cavity 98 by means of the snap rings 125 which secure the respective bevel gears 124 and 126 thereto. The end portion 129 of shaft 122 has a portion 131 which is rotatably positioned in a cavity 133 in the end portion 127 of shaft 120. This provides a sturdy differential structure with output shafts that are not longitudinally movable.

The tubular ends of the bevel gears 124 and 126 are supported in the differential housing annular end portions 110 and 106 by means of bushings 128. The shaft 122 is in turn supported in the closure member aperture recessed portion 86 by means of ring members 130.

A clutch mechanism generally designated by the numeral 132 is adapted to frictionally engage the differential housing sleeve portion 118 to the shaft 120. The clutch mechanism 132 includes a clutch housing 134, a clutch actuator generally designated by the numeral 136 and a rotary seal 138. The clutch housing 134 has an internal spline 140 and an annular end plate 142 secured to the inner surface of the housing 134 adjacent one end. The other end of the clutch housing 134 has an annular plate 144 secured to its outer surface to form a bolt flange.

The differential housing sleeve 118 has an external splined portion 146 thereon. The clutch housing 134 is axially positioned around the differential housing sleeve 118 and a plurality of friction discs 150 are nonrotatably secured to the inner surface of the housing 134 by means of the splines 140. A plurality of friction discs 148 are nonrotatably secured to the differential housing sleeve 118 by means of the splines 146 and are interleaved between the friction discs 148. Both the friction discs 148 and 150 are axially movable relative to the respective differential housing sleeve 118 and clutch housing 134 so that upon movement of the discs 148 and 150 against the inner surface of the annular end plate 142 the differential housing sleeve 118 will be in frictional engagement with the clutch housing 134. When the discs are so frictionally engaged the clutch housing 134 will rotate in unison with the differential housing 118.

The clutch actuator 136 includes a clutch cylinder 152, piston 154 and return spring 156. The clutch cylinder 152 has a body portion 158 with an inwardly extending annular flange 160. The clutch cylinder 152 is adapted to be detachably secured to the clutch housing bolt plate 144 by means of the bolts 162 extending through aligned apertures in both the clutch housing bolt plate 144 and the clutch actuator cylinder flange 160. The clutch cylinder 152 has an oppositely extending sleeve portion 164. The inner surface of the sleeve portion 164 has a plurality of splines 166 which are in mating relation with a plurality of external splines 168 on the shaft 120. Thus since the clutch cylinder sleeve 166 is axially positioned on the shaft 120 it is in nonrotatable relation thereto in order that the clutch cylinder 152 may rotate with the shaft 120. Also, since the clutch housing 134 is secured to the clutch cylinder 152 both the clutch housing 134 and clutch cylinder 152 rotate with the shaft 120.

The clutch mechanism 132 is rotatably supported relative to the differential housing sleeve 118 by means of the bushing 170 positioned on the external surface of the sleeve 118 adjacent the differential bearing support 72. A ring member 172 is positioned in the aperture of the clutch housing annular plate 142 and is in frictional contact with the bushing 170 to rotatably support the end of the clutch mechanism 132 adjacent the differential casing 64. The other end of the clutch mechanism 132 is maintained in position on the splined portion of the shaft 120 by means of the snap ring 174 that urges the splined surface of the clutch cylinder sleeve 164 against the shoulder 176 of shaft 120.

The clutch cylinder sleeve 164 has an inwardly extending portion 178 adjacent the differential housing sleeve 118. The annular piston 154 slides axially relative to the cylinder housing 152 on the cylinder sleeve portion 178. The piston 154 has a body portion 180 with an inwardly extending annular actuator portion 182. The actuator portion 182 has an inwardly flanged portion 184 which is in abutting relation with the clutch disc 150. The piston flange portion 184 has a peripheral splined portion 186 which mates with the clutch housing splines 140 so that the piston 154 is nonrotatably engaged to the clutch housing 134 but is axially movable relative thereto. Thus when the piston 154 is moved axially toward the end plate 142 the piston flange portion 184 moves the annular discs 148 and 150 against each other and against the end plate 142 to frictionally engage the plates to each other. The return spring 156 abuts the piston body portion 180 at one end and the clutch housing 134 at the other end and returns the piston 154 to a clutch disengaged position in the absence of fluid pressure urging the piston 154 toward the discs 148 and 150.

The clutch cylinder sleeve 164 has an annular recessed portion 188 in its external wall 190 and a plurality of longitudinal bores 192. The bores 192 connect the recessed portion 188 to the inner portion of the clutch cylinder 152.

The cylindrical rotary seal 138 is axially positioned on the clutch cylinder sleeve external surface 190 and has a radial aperture 194 which is in mating relation with the clutch cylinder recessed portion 188. Thus as the clutch cylinder sleeve 164 rotates relative to the rotary seal 138 liquid under pressure may be provided through the aperture 194 to the recessed portion 188. A plurality of rings 196 provide a liquid seal and bearing surface for the rotary seal 138. An annular plate 198 maintains the rings 196 and rotary seal 138 in position. A snap ring 200 maintains the plate 198 in position on the cylinder sleeve 164. The rotary seal 138 is maintained in nonrotatable relation relative to the clutch actuator 136 by means of the retainer member 202 which is threadably secured at one end to the rotary seal 138 and rigidly secured at the other end to the transmission casing 42. Pin members 204 provide a means for detaching the rotary seal 138 from the transmission casing 42.

Operation

Under normal operating conditions the clutch mechanism 132 is maintained in a disengaged position. In this clutch disengaged position the output shafts 38 and 40 are differentially driven and the differential mechanism 36 automatically compensates for the variation in speed of the front and rear pairs of wheels. As stated, the causes of the variation in speed may be due to slight differences in the tire diameter or the like. In the clutch disengaged position the clutch 132 rotates at the same speed as the output shaft 120. This is so because the clutch cylinder 152 is splined to the shaft 120 and the clutch housing 134 is secured to the clutch cylinder 152. Differential drive is provided for the shaft 120 by means of the differential 36, and the clutch 132 does not interfere with the differential drive while the clutch 132 is in a disengaged position.

When one or a pair of wheels loses traction and substantially all of the power from the prime mover 28 is transmitted to the traction free pair of wheels, the operator through a manual valve means or the like, supplies liquid under pressure to the port or inlet 194 of the rotary seal 138. The liquid under pressure enters the recessed portion 188 and passes through the clutch cylinder longitudinal bores 192 and exerts a pressure against the rear wall of the piston 154. The liquid under pressure moves the piston 154 axially in the cylinder 152 so that the piston flange portion 184 moves the interleaved clutch discs 148 and 150 axially into frictional engagement with each other. Since the clutch discs are respectively splined to the clutch housing 134 and the differential housing sleeve 118, the clutch housing 134 and differential housing 90 are frictionally engaged to each other. In effect this results in the output shaft 120 being frictionally engaged to the differential housing 90. Thus in the clutch engaged position the differential 36 is ineffective to provide differential drive because differential action between the differential housing 90 and the output shaft 120 is eliminated. This results in equal distribution of torque from the transmission terminal element 116 to both output shafts 120 and 122. In this manner, the operator can utilize the torque transmitted to the pair of wheels having traction to propel the vehicle until all wheels have substantially equal traction.

When substantially equal traction to all wheels is obtained, the operator may manually release the fluid pressure exerted on the clutch piston 154. The clutch return spring 156 will return the piston to a clutch engaged position and again both output shafts will be differentially driven.

Further, with my invention the clutch plates 148 and 150 may be easily replaced without disassembling the differential 36. This is possible by the arrangement and construction of my fluid operated clutch mechanism 132. To replace worn clutch plates 148 and 150 all that is required is to remove pin member 202, then snap ring 174 and cap screws 162. The clutch actuator 136 is then movable axially away from clutch housing 134 on shaft 120. The clutch plates may then be removed from the housing 134 and replaced. The actuator is then replaced on the shaft 120 in abutting relation with the housing and after replacement of pin member 202, snap ring 174 and screws 162 the lock-up clutch is again in operative condition.

With my invention I have provided a single prime mover type haulage vehicle with a pair of differentially driven output shafts and a lock-up means for the longitudinal differential mechanism.

According to the provisions of the patent statutes, I have explained the principle, preferred construction, and mode of operation of my invention and have illustrated and described what I now consider to represent its best embodiment. However, I desire to have it understood that within the scope of the appended claims, the invention may be practiced otherwise than as specifically illustrated and described.

I claim:

1. A haulage vehicle comprising a mobile body having a material receiving compartment extending lengthwise thereof, pairs of front and rear traction wheels for said body, a selective multi-speed transmission arranged on said body at one side of said compartment intermediate said pair of wheels, a prime mover arranged on said body at said side of said compartment adjacent one end of said body, driving connections between said prime mover and said transmission, other driving connections between said pair of front traction wheels and between said pair of rear traction wheels, said other driving connections each including a transverse differential arranged on said side of said compartment, a differential casing secured to said transmission at said side of said compartment, said differential casing housing a longitudinal differential, said longitudinal differential including a differential housing and a pair of differentially driven output shafts extending longitudinally in opposite directions therefrom, said transmission having a terminal element adapted to drive said differential housing, said output shafts connected at their free ends to said respective transverse differentials, a differential lock-up clutch including an annular housing coaxially positioned on one of said differentially driven output shafts, annular friction means secured to and rotatable with said clutch housing, second annular friction means positioned within said clutch housing, said second annular friction means secured to and rotatable with said differential housing, an annular clutch actuator secured to and rotatable with said last named output shaft, means detachably securing said clutch actuator to said clutch housing, said clutch actuator having fluid pressure operated means to frictionally engage said first and second friction means to each other to thereby frictionally engage said differential housing to said last named output shaft to provide substantially direct drive from said transmission terminal element to both of said output shafts, said clutch actuator including positive release means to disengage said fluid pressure operating means from said friction means and said clutch actuator being constructed and arranged to be detached from said annular housing and moved axially on said last named output shaft to provide access to said first and second friction means without disassembling said longitudinal differential.

2. A haulage vehicle comprising a mobile body having a material receiving compartment extending lengthwise thereof, pairs of front and rear traction wheels for said body, a selective multi-speed transmission arranged on said body at one side of said compartment intermediate said pair of wheels, a prime mover arranged on said body at said side of said compartment adjacent one end of said body, driving connections between said prime mover and said transmission, other driving connections between said pair of front traction wheels and between said pair of rear traction wheels, said other driving connections including a pair of transverse differentials arranged on said side of said compartment, a differential casing secured to said transmission at said side of said compartment, said differential casing housing a longitudinal differential, said longitudinal differential including a differential housing and a pair of differentially driven output shafts extending longitudinally in opposite directions therefrom, an annular clutch housing coaxially positioned on one of said output shafts, a plurality of annular clutch plates positioned within said housing in rotatable relation therewith, other annular clutch plates interleaved between said first named clutch plates within said housing, said other clutch plates secured to and rotatable with said differential housing, an annular clutch actuator secured to and rotatable with said last named output shaft, means detachably securing said clutch housing to said clutch actuator for rotation therewith, said clutch actuator including fluid pressure operated means to frictionally engage said first named clutch plates to said other clutch plates to thereby frictionally engage the differential housing to said last named output shaft to provide substantially direct drive from said terminal element to both of said output shafts, said clutch actuator including resilient means to disengage said fluid pressure operated means from said clutch plates, said clutch actuator having an annular rotary seal positioned coaxially on said last named output shaft in operative relation with said clutch actuator to provide fluid under pressure thereto, means preventing rotation of said seal relative to said clutch actuator, and said clutch actuator being constructed and arranged to be detached from said annular housing and moved axially on said last named output shaft to provide access to said clutch plates without disassembling said longitudinal differential.

References Cited in the file of this patent

UNITED STATES PATENTS

| | | |
|---|---|---|
| 1,192,277 | Daimler | July 25, 1916 |
| 1,812,801 | Nus | June 30, 1931 |
| 2,080,477 | Higgins et al. | May 18, 1937 |
| 2,203,282 | Keese | June 4, 1940 |
| 2,623,604 | Keese | Dec. 30, 1952 |
| 2,719,442 | O'Leary | Oct. 4, 1955 |
| 2,754,015 | Lee | July 10, 1956 |
| 2,768,538 | Simmonds | Oct. 30, 1956 |
| 2,803,149 | Pringle | Aug. 20, 1957 |